United States Patent [19]
Azarian et al.

[11] Patent Number: 5,885,131
[45] Date of Patent: Mar. 23, 1999

[54] INTERACTIVE DEVICE FOR LAPPING TRANSDUCERS

[75] Inventors: Michael H. Azarian, Wallingford, Pa.; Michael A. Baldwinson, Santa Clara, Calif.; David T. Gutowski, Penacook, N.H.; Harold J. Hamilton, Santa Clara, Calif.; James P. Hennessy, San Jose, Calif.; Mark W. Parcher, Fremont, Calif.; Kenneth K. H. Tang, Cupertino, Calif.

[73] Assignee: Censtor Corporation, San Jose, Calif.

[21] Appl. No.: 861,997

[22] Filed: May 24, 1997

Related U.S. Application Data

[63] Continuation of Ser. No. 452,041, May 26, 1995, Pat. No. 5,632,669.

[51] Int. Cl.$^6$ ............................ B24B 49/02; B24B 49/10
[52] U.S. Cl. ........................... 451/5; 451/9; 29/603.08; 29/603.12; 29/603.16
[58] Field of Search .................... 29/407, 603.08, 29/603.09, 603.1, 603.12, 603.16, 603.17; 216/88, 89; 438/692, 693; 451/5, 8, 9, 10, 11, 21, 41, 54

[56] References Cited

U.S. PATENT DOCUMENTS

| | | | |
|---|---|---|---|
| 4,675,986 | 6/1987 | Yen | 29/592.1 X |
| 4,912,883 | 4/1990 | Chang et al. | 451/1 |
| 4,914,868 | 4/1990 | Church et al. | 451/5 |
| 5,175,938 | 1/1993 | Smith | 29/407.1 X |
| 5,386,666 | 2/1995 | Cole | 451/5 |
| 5,632,669 | 5/1997 | Azarian et al. | 451/54 |

*Primary Examiner*—Timothy V. Eley
*Attorney, Agent, or Firm*—Mark Lauer

[57] ABSTRACT

An interactive device for lapping transducers has a body with an abrasive surface that communicates with the transducers in order to provide information for controlling the lapping and testing the transducers. The lapping body is preferably shaped as a disk, drum or tape, and communicates with the transducer using a type of signal that the transducer is designed to read and/or write. Thus for lapping a magnetic head or slider to be employed in a hard disk drive, the lapping body contains a magnetic medium layer that is either prerecorded or written by the head during lapping, while the signal received by the head is monitored and analyzed by a processor in order to determine, in part, when to terminate lapping. A series of transducers can be simultaneously lapped while individually monitored, so that each transducer can be removed from the lapping body individually upon receipt of a signal indicating that transducer has been lapped an optimal amount. Transducers for employment in drive systems can also be tested for performance characteristics by utilizing lapping bodies having surface characteristics similar to those found in the drive system.

18 Claims, 7 Drawing Sheets

INTERACTIVE DEVICE FOR LAPPING TRANSDUCERS

CROSS REFERENCE TO RELATED APPLICATIONS

This is a continuation of U.S. Pat. No. 5,632,669, filed May 26, 1995 as application Ser. No. 08/452,041.

TECHNICAL FIELD

The present invention is generally directed to the manufacture of transducers for information storage systems such as disk or tape drives, with particular emphasis on methods and apparatuses for lapping transducers employed in rigid magnetic disk drives.

BACKGROUND OF THE INVENTION

In rigid magnetic media disk drives, the transducer, for writing and reading information on the media, typically is formed on or attached to a ceramic carrier, a "slider," which is supported by a flexible suspension, which is in turn mounted on an arm of an actuator assembly. The magnetic pole or poles of the transducer are positioned coplanar with the surface of the slider, which confronts the media. In the past, such sliders have been designed to "fly" above the surface of the rotating media at the minimum "flying height" consistent with the need to maintain sufficient separation in order to avoid catastrophic wear and achieve long term reliability. The need to fly low, in order to increase recording density and performance, is thus in conflict with constraints imposed by mechanical and interface considerations. The latter relate to a variety of design, manufacturing and quality control issues, not only of the slider but also of the surface properties of the media. In particular, tight tolerances are required in creating the "air bearing surface," configuring the "ramp," controlling "throat height" and "pole tip recession" and attaching the slider to the gimbal suspension structure. The allowable tolerances have decreased very rapidly, as the flying height has been reduced and recording density increased over the years, presenting greater and greater challenges to manufacture.

It should be noted, in passing, that similar considerations and limitations can be involved in the design and manufacture of all systems which utilize transducers to sense or record images from or to a medium. That is, the resolution of such systems is inversely related to the spacing separating the resolving elements of the transducer, e.g., an aperture in a near-field optical system, from the medium. As will become apparent, the present invention may be applicable to any system in which the particular geometry of a transmitting or receiving terminal of the transducer is important to signal transmission.

A particular manufacturing process that has been employed in defining critical features of transducers or heads used in magnetic read/write disk drive systems is the lapping of the transducers by an abrasive surface. With the typical heads of such systems that are designed to "fly" on an air layer during reading or writing operations with a disk, such lapping has been used to form the air bearing surfaces and ramps of sliders. A particular problem encountered in mass production of such heads is the differential extent to which a row of heads may be lapped, due to "bowing" of the row and other factors. In U.S. Pat. No. 5,321,882, Zarouri et al. propose that the lapping of a group of air bearing sliders is more advantageously accomplished by holding the sliders in a column rather than a row. On the other hand, Bischoff et al., in U.S. Pat. No. 5,117,589, disclose a device for adjusting the bowing of a row of sliders held by the device during lapping, by mechanically or electronically compensating for bowing.

Commonly, such lapping of flying heads includes an electrical lapping guide attached to or incorporated in the device holding the transducers in an attempt to determine when optimal material has been removed, for example, for the throat height of the heads. As noted in U.S. Pat. No. 4,675,986 to Yen, electrical lapping devices have a graded resistance at a surface of the holding device in order to measure the lapping of the heads by measuring the resistance of the holding device. U.S. Pat. No. 5,175,938 to Smith teaches means for improving the accuracy of an electrical lapping guide by combining different types of graded resistors. Similarly, in U.S. Pat. No. 4,914,868, Church et al. disclose a lapping control system for magnetoresitive transducers that measures the resistance of those transducers to determine lapping height. And Zammit teaches, in U.S. Pat. No. 5,065,483, a method for lapping thin film heads that compares a resistive lapping guide with a finished lapping guide in order to calculate appropriate lapping amounts of the heads.

Another approach to achieving smaller tolerances for head throat heights is to perform an additional step for adjusting throat heights after lapping. Amin et al., in U.S. Pat. No. 5,137,750, teach a method of making pole heads that may be etched after lapping to create contoured pole tips. U.S. Pat. No. 5,283,942 to Chen et al. similarly discloses an etching step which controls planarization of a gap layer at a pole tip. And in U.S. Pat. No. 5,327,638, Haines et al. teaches first lapping a magnetic core for a vertical recording head and then winding an electrical coil around the core.

Despite these advancements, a need for ever more accurate transducer dimensions calls for continued improvement in the processes used for their manufacture. Moreover, a dramatic recent departure from the conventional magnetic recording technology has resolved the conflicting demands between the reduction in flying height needed to increase data storage density and the increased tendency to crash as flying height is reduced. This conflict is resolved by adopting a fundamentally new slider/suspension design logic, which assumes at the outset the possibility of reliably operating the slider/transducer in continuous sliding contact, and is of key importance in U.S. Pat. No. 5,041,932 to Hamilton for INTEGRATED MAGNETIC READ/WRITE/FLEXURE/CONDUCTOR STRUCTURE, assigned to the assignee of the present invention. This new technology has demonstrated, in many hundreds of thousands of hours of cumulative testing, virtual freedom from "head crash" and the capability for reliable, long term operation of sliders in continuous sliding contact with the media. In consequence of these developments, the magnetic spacing loss has been reduced dramatically while the recording density has been correspondingly increased, and the manufacture of head/suspension structures has been greatly simplified.

It is with the preparation of a transducer surface for optimal conformation and operational confrontation with a media surface that the present invention is concerned. Therefore, it is a general objective of this invention to facilitate the manufacture of transducers so as to increase yield and operational performance and decrease costs. A specific objective of this invention is to provide simple, cost effective means and methods of preparing the media-confronting surface of sliding and flying heads in concert with their suspension structures, termed "sliders", so as to enable optimal magnetic interaction with the media.

SUMMARY OF THE INVENTION

The above objects have been achieved with a system for lapping transducers which employs an abrasive surface that transmits a signal during lapping, while monitoring the transducer during lapping for an indication derived from the signal that the transducer has been optimally lapped. To perfect a pole tip for a magnetic head, for instance, a slider surface is lapped sufficiently to either expose the magnetic pole or to optimize a throat height for magnetic interaction with an information storage medium. The optimal amount of lapping is determined directly by reading information from and/or recording information to a body having a relatively moving abrasive surface, which serves simultaneously as an abrader and an information storage device.

Such a system for determining when to terminate the lapping of slider surfaces in order to optimize mechanical and recording performance has many advantages, the most important of which may be that reading and/or recording performance is by far the most sensitive measure of the point at which the magnetic pole or poles of the transducer come into optimal relationship with the media. Another advantage that can be achieved with such an interactive lapping system is the ability to test a transducer for mechanical and electromagnetic performance characteristics following lapping, testing which may be accomplished with the same device used for lapping.

In a preferred embodiment, magnetically active lapping disks having surface coatings with topographies and molecular structures forming superhard materials specifically optimized for lapping are employed. Superhard materials are defined in this application as having a hardness greater than 400 kg(force)/mm². Lapping may be performed in steps with a plurality of disks having decreasing roughness and/or hardness, so that transducer machining progresses generally from rough lapping to polishing. Individual lapping bodies such as disks may also be constructed to have a graded roughness, so that a transducer may be moved from a rough to a smooth portion of the body according to signals received from the transducer.

In a mass production lapping environment, upon receipt of signals indicating that an individual transducer has been appropriately lapped, that transducer may be individually removed from the lapping body, thereby eliminating the problems of the prior art with uneven lapping of a row of transducers. Moreover, preparing the slider surface while mounted on an individual suspension rather than a row bar affords an opportunity not only to individually control the lapping operation for each of many slider suspension structures in an automated process, but also to automatically test and grade each head for read/write performance. Performing lapping as one of the final steps in transducer fabrication also allows automatic testing and grading of dynamic mechanical performance of each slider suspension structure while in sliding contact operation with a disk surface, while flying slightly above the surface for the case of flying heads or while in "pseudo contact" somewhat between flying and sliding for tail dragging heads. In each of these situations, transducer signal information may be utilized in combination with electromechanical transducers, e.g., laser Doppler vibrometers, and signal processing and analysis.

In addition to the advantages mentioned above, the improvements in machining tolerances and transducer performance testing are achieved in a relatively simple system that does not require extra etching steps or the electrical lapping guides taught in the prior art of lapping magnetic sliders. In this context, the present invention not only offers a means for optimizing throat height and similar dimensions by using the most sensitive and accurate measurement of those dimensions, but allows for integrated testing of individual transducer characteristics to determine whether each transducer, slider and suspension conforms to required specifications, in an automated system which individually controls lapping and testing of multiple transducers simultaneously, yet simplifies the lapping process.

BEST MODE FOR CARRYING OUT THE INVENTION

Figure 1:
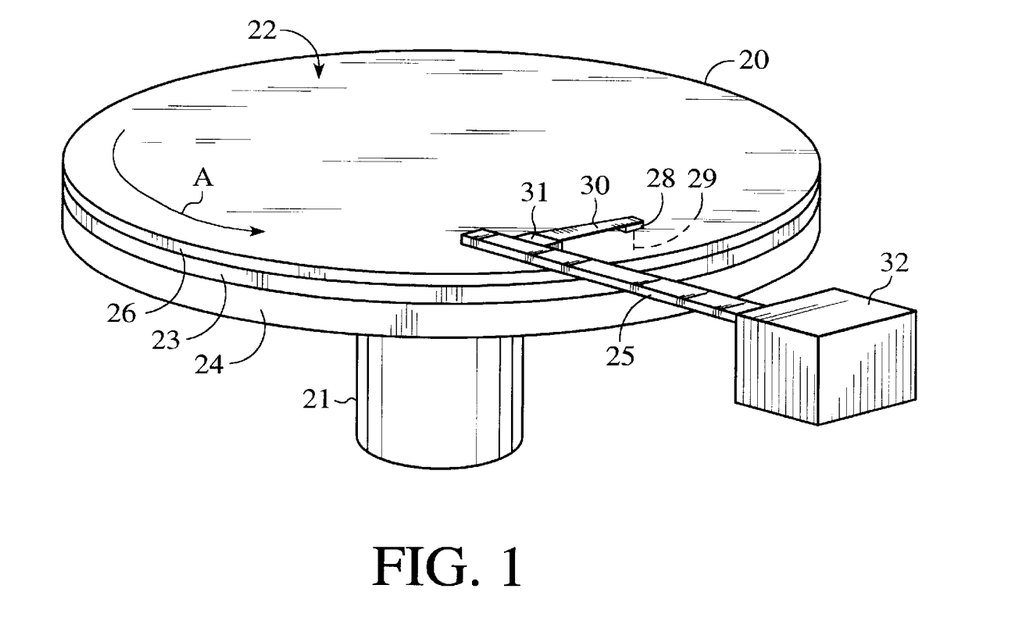
FIG. 1 is a perspective plan view of a simple interactive lapping system of the present invention.

Referring now to FIG. 1, a lapping disk 20 having an abrasive surface 22 is shown rotating in a direction of arrow A. Associated with the surface 22 is a magnetizable medium 23, which may be formed at the surface 22 or may be disposed beneath the surface at a distance which affords communication of magnetic signals through the surface. A substrate 24 is disposed beneath the medium layer 23 and connected to a conventional means for rotating the disk such as an electric motor 21. For clarity of illustration the medium layer 23 is shown in FIG. 1 at an exaggerated distance beneath the surface 22, separated by a hard protective layer 26. Alternatively, the surface 22 may be associated with another communication medium, such as an electrical or optical storage medium, for lapping transducers employed in information storage systems of those media.

Projecting inwardly over the surface 22 is a support bar 25 which, for simplicity, is shown to be holding a single transducer 28 via a flexure beam 30, the beam connected to the bar 25 along with a positioning mechanism 31 located near the juncture of the beam 30 and the bar 25. An electromagnetic signal 29 is shown schematically in this plan view as providing communication between the transducer 28 and the media 23 in order to provide information to a processor 32 regarding the lapping of the transducer 28. The transducer 28 in this embodiment is designed for contact reading and writing with rigid magnetic storage media, such as described in the above mentioned U.S. Pat. No. 5,041,932, in co-pending U.S. patent application Ser. No. 08/338,394, entitled: TRANSDUCER/FLEXURE/CONDUCTOR STRUCTURE FOR ELECTROMAGNETIC READ/WRITE SYSTEM and in co-pending U.S. patent application Ser. No. 08/408,036, entitled: CONTACT INTERFACE, SYSTEM AND MEDIUM IN ELECTROMAGNETIC, READ/WRITE, RIGID-RECORDING-MEDIA ENVIRONMENT, which are hereby incorporated by reference.

The beam 30 and bar 25 include conductive elements that can carry signals between transducer 28 and processor 32, which is shown simply as a box in this plan view. The processor 32 monitors the transducer 28 during lapping with the disk 20, so that upon receiving a signal from the transducer indicating that an optimal amount of lapping has occurred, the processor sends a signal to the positioning element 31, which causes the positioning element to lift the flexure beam 30 and transducer 28 from the surface 22, terminating lapping. The positioning element may be a piezoelectric body, spring loaded switch, vacuum lift or other mechanism which lifts the beam 30 upon receiving a signal from the processor 32. Alternatively, the signal can be manually monitored for a visible or audible signal at which point the lapping bar 25 can be manually raised, lifting the transducer from the disk to terminate lapping.

Figure 2:
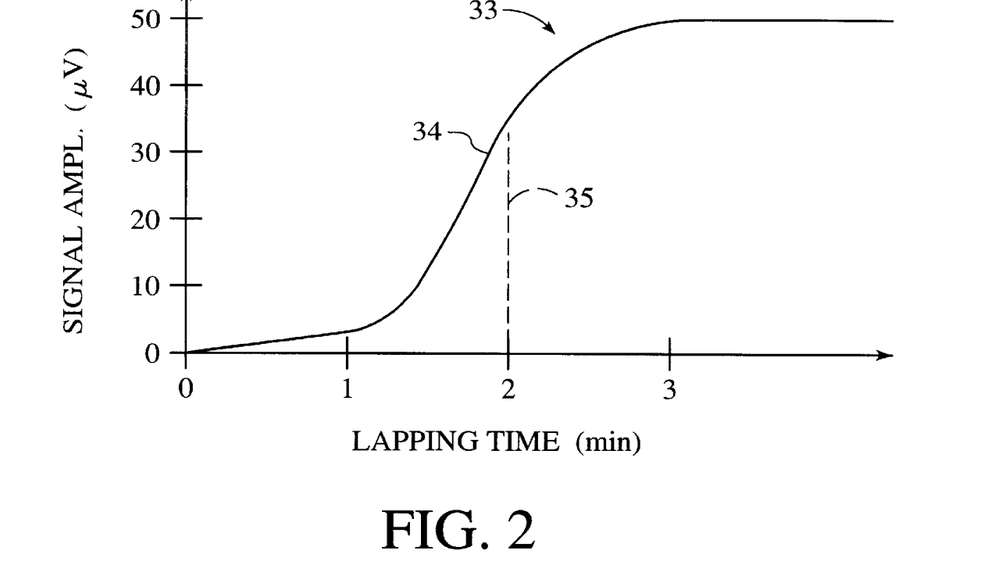
FIG. 2 is a plot of an increasing amplitude electronic signal received from a transducer being lapped in the system of FIG. 1.

FIG. 2 shows a plot 33 of an electronic signal received at processor 32 during lapping of transducer 28 with lapping disk 20. Typically, little or no signal is obtained initially from the transducer 28. As the lapping proceeds, a small signal is generated, after which the signal amplitude increases rapidly as shown by the steeply sloped portion 34 of the amplitude plot 33. Subsequent amplitude growth is minimal. The signal amplitude increases during lapping as material impeding transmission of the signal 29 is removed from a terminal of the transducer 28 by lapping, allowing closer spacing between the terminal and the medium. The appropriate time at which to terminate lapping depends on a number of factors, and may occur during or just following the steeply sloped section 34 of the signal amplitude plot 33, as delineated by time 35 of about 2 minutes. The signal received by the transducer 28 from the lapping disk 20 can be from a signal that was previously written on the disk or a signal that is written on the disk 20 by the transducer 28 during lapping. This latter method of writing and reading the disk 20 during lapping is preferable as the signal increases with lapping due to increasing both writing and reading signals, thereby enhancing sensitivity. The simultaneous writing and reading during lapping also provides a method for testing the writing capability of the transducer 28, as well as simplifying the lapping procedure by eliminating prewriting of the disk 20.

Figure 3:
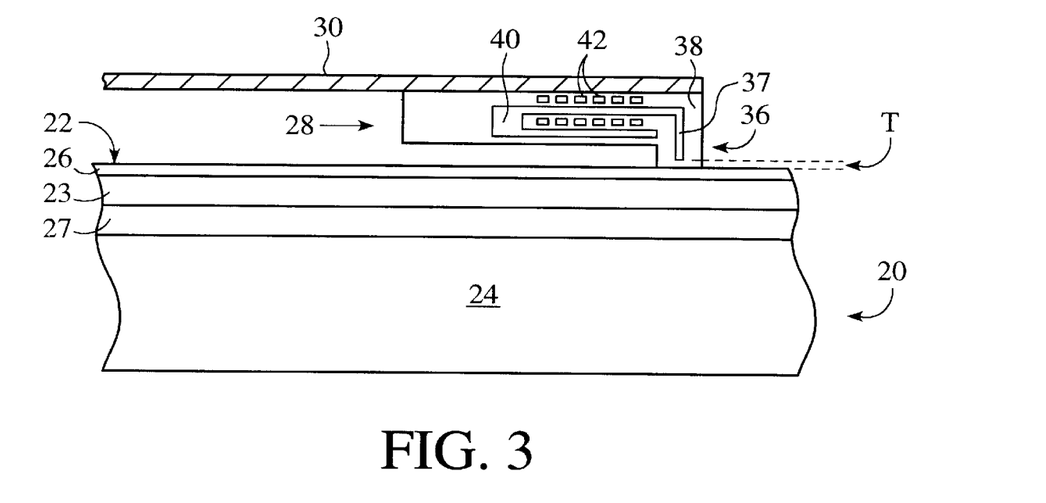
FIG. 3 is a fragmentary, expanded, cross-sectional view of a portion of the lapping system of FIG. 1.

FIG. 3 shows a more detailed view of the structure of the transducer 28 and the lapping disk 20. The disk substrate 24 is formed of a self-supporting material such as an aluminum alloy. Another hard layer 27 may be deposited atop the substrate 24 and textured before the magnetic layer 23 is sputtered thereon, the texture being substantially reflected in both the magnetic layer 23 and the hard coating 26, and therefore providing a texture to the surface 22. For the alternative situation in which the hard coating is formed directly atop the medium 23, the substrate is first textured in order to obtain a similarly textured surface 22.

As is known in the formation of rigid magnetic disks, the magnetic layer 23 may be made of, for example, alloys or lattice superstructures of iron, nickel, cobalt, palladium or platinum. For a rough lapping disk, the thickness of layer 23 may be over twice that typical for magnetic disks, or as much as about 1000–2000 angstroms, in order to allow a thicker coating layer. Layer 23 is shown as a single layer, which would be appropriate for longitudinal recording, while for perpendicular recording a dual magnetic layer would typically be formed. In the latter case, the stiffening layer 27, the stiffening layer may become a second magnetically soft (although mechanically hard) layer for use in perpendicular recording.

The hard protective layer 26 may be formed of diamond-like-carbon (DLC), silicon carbide, boron carbide or other superhard materials. It is important that this layer 26 be hard for durability of the lapping disk 20, thin enough to allow magnetic communication between the transducer 28 and the magnetic medium 23, and have a surface 22 texture or topography optimized for lapping the transducer. For the case of a rough lapping disk, hard coating layer 26 may have a thickness of between 500 and 2000 angstroms, and preferably approximately 1000 angstroms or less. For a smooth lapping disk the coating layer 26 is substantially thinner, preferably about 200 to 300 angstroms or less, allowing for more sensitive communication with a transducer 28 and more accurate testing of various transducer parameters.

The transducer 28 has a head 36 containing a pole 37 for communication with both the magnetic medium layer 23 of lapping disk 20 and a magnetic medium of a rigid storage disk or drum, not shown. Pole 37 is surrounded by a hard, wear-resistant, nonmagnetic material 38 such as DLC, which obstructs pole 37 from communicating with layer 23 or other magnetic media by a layer of the hard material 38 having a thickness T. Although a single pole is shown in this figure, which is appropriate for vertical recording and reading of a magnetic storage medium, transducer 28 may contain an adjacent pole, not shown, the gap therebetween utilized for longitudinal reading and writing of a storage medium. Alternatively, structures associated with a magnetoresistive sensor may be present in addition to, or in place of, the aforementioned pole or poles. In an upper portion of transducer 28, a soft magnetic core 40 connected with pole 37 is surrounded with a helical series of conductive elements 42 to form a helical winding used for inductively reading or writing through the pole 37 or poles. Alternatively, a spiral or pancake coil structure, not shown, may be utilized. Transducer 28 is attached to flexure beam 30, with conductors in the beam 30 connecting with ends of the helical winding and, at an opposite end, with bar 25 and processor 32 shown in FIG. 1.

The use of progressively smoother lapping disks offers a significant reduction in pole tip recession, which can be augmented by rounding of the pole tips by lapping techniques discussed below, including tilting of single pad transducers and lapping with a tape that tends to conform to the pad or pads. Note that the interactive lapping of the present invention is performed without water or other lubricants or slurry. An electrolyte solution, however, may be distributed on the surface of a final stage lapping or polishing disk, and a voltage provided between the transducer and disk, in order to grow the exposed magnetic pole or poles so that pole tip recession is eliminated. In other words, after lapping is completed pole 37 terminates coextensively with hard wear material 38 at essentially the same distance from the surface 22 and medium layer 23 as the remainder of the head 36, eliminating the problem of pole tip recession in the fabrication of transducers. It is also possible to distribute a solution that selectively etches the hard wear material 38 compared to that of the pole 37 and surface 22. Pole tip recession in prior art devices presents a problem in both flying type heads and contact heads by spacing the tip of the pole further from the magnetic medium, thereby decreasing the resolution at which magnetic data can be written and read.

Figure 4:
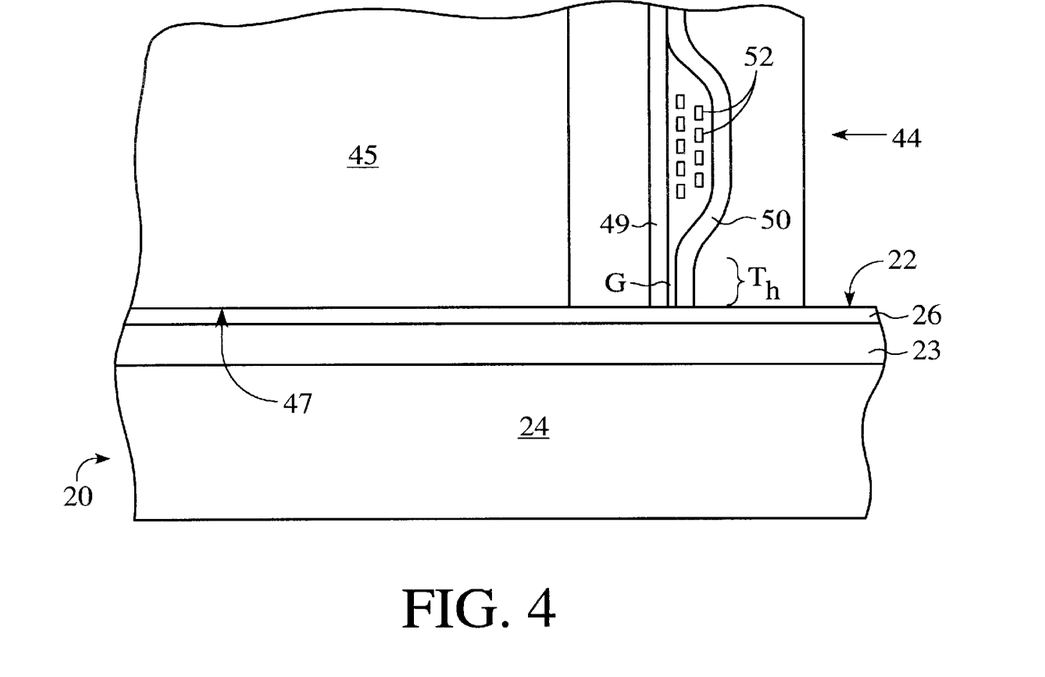
FIG. 4 is a fragmentary, expanded, cross-sectional view of a portion of a conventional flying head being lapped by the system of claim 1.

FIG. 4 illustrates the employment of the interactive lapping of the present invention for a magnetic read/write head 44 designed to fly over a storage surface. The elements of the interactive lapping disk 20 denoted previously are shown here without delineation for brevity. The head 44 is attached to a slider 45 having an air bearing surface 47 which is lapped along with the head 44, which can be seen to offer an extension of the air bearing surface 47. A pair of soft magnetic poles 49 and 50 extend to the bearing surface 47, separated by a gap G at that surface that forms magnetic fields employed typically in longitudinal recording. A number of conductive elements 52 are wound between the poles 49 and 50 for inductive coupling to those poles to read and/or write magnetic information to a rigid disk. Critical to the performance of the head 44 is the throat height Th, as the magnetic coupling of signals is stronger as the throat height Th is reduced, but reduction of the throat height Th to a point at which the gap G widens destroys the data resolution capability of the transducer. By monitoring signals from the head 44 during the lapping process, critical dimensions of the throat height Th and gap G can be sensitively optimized for performance and longevity. Although not shown, note that a transducer designed for "pseudo-contact" or "tail-dragging" operation can be advantageously fabricated with the present invention, in particular with regard to configuring the throat, which is located at the tail and dragged or bounced against a disk during operation.

As previously mentioned, a transducer or transducers can be machined with the interactive lapping technique of the present invention in a plurality of steps, using successively smoother lapping bodies. In this fashion, pole tip recession can be reduced and performance testing facilitated. An abrasive surface 53 of a rough lapping disk that would be used in an initial step of lapping magnetic heads or sliders for communication with hard magnetic disks is shown in schematic or idealized form a greatly enlarged cross-section in FIG. 5 to have series of peaks 54 and valleys 55. Note that the horizontal axis is denoted in microns while the vertical axis is denoted in nanometers. The surface 53 represents the exposed portion of a hard coating layer 26 having a thickness of approximately 80 nanometers, which is not shown in this figure in order to better illustrate the roughness of surface 53. Disposed beneath the hard coating layer 26 is a medium layer 23 which also has a thickness of about 80 nanometers and is not shown in this figure, and which has a texture at the interface with the hard layer 26 which is similar but may be smoother or rougher than that of the exposed surface 53, depending upon formation characteristics. Below the medium layer 23, the substrate 24 is adjoined with a texture that reflects that of the surface 53 and the interface between the hard coating 26 and the medium 23, but which may be smoother or rougher still.

Figure 5:
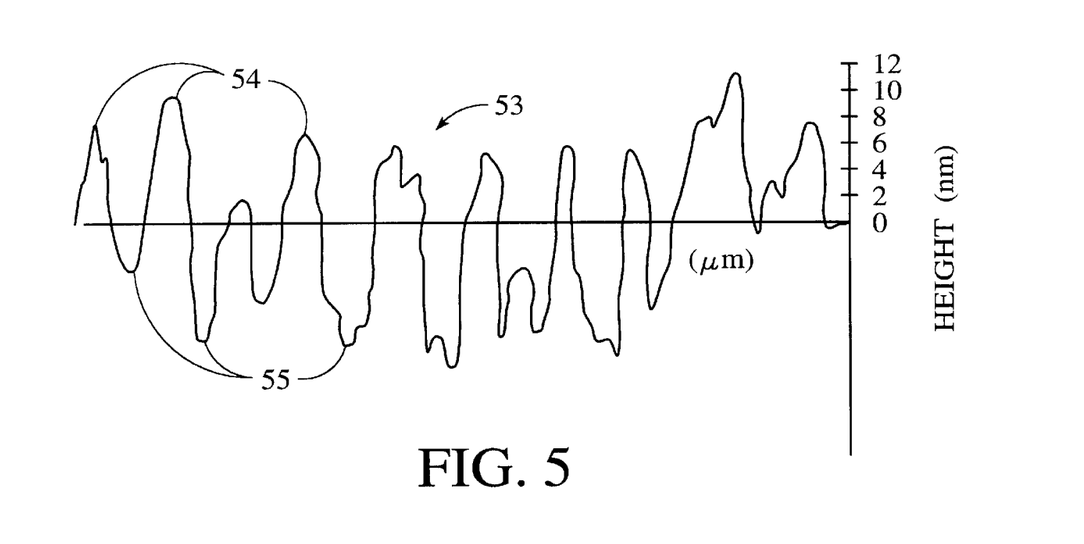
FIG. 5 is a plot of a surface topography of an interactive rough lapping disk of the present invention.

Formation of the rough lapping surface 53 begins by roughening or texturing at least one major surface of a substrate 24 made of aluminum alloy, for example. Such texturing can be accomplished effectively by rubbing an abrasive tape on the surface, preferably in a radial direction as the disk is rotated more slowly or in discrete steps to effect roughening on all but an inner core. The roughness imparted to the disk substrate at this stage may need to be greater or less than that desired for the surface 53, as the subsequent deposition of the medium layer 23 and then the hard coating layer 26 retains major features of the substrate roughness but may increase, decrease or substantially parallel smaller feature roughness, depending upon formation processes and materials. Atop the roughened substrate 24 is sputter deposited the medium layer, which may be formed of alloys or superlattice structures of iron, nickel, cobalt, platinum, palladium or other magnetic materials known in the art. Atop the medium layer 23, the hard coating layer 26 may be formed of DLC, cathodic arc carbon, silicon carbide, boron carbide or other superhard materials. To form the hard layer 26 of DLC, for example, plasma enhanced chemical vapor deposition (CVD) or sputtering may be employed. It should be noted that DLC is an essentially amorphous mixture containing carbon atoms with bonds ranging from $SP^3$ orientations characteristic of diamond, to $SP^2$ bonds such as are found in graphite, to $SP^1$ bonds characteristic of polymers, including from about 2% to about 30% (by mole) hydrocarbons. By varying the process parameters during deposition, the material characteristics of layer 26 and surface 53, including hardness, roughness and durability can be tailored to match the lapping needs of the transducers being worked. Formation of the hard coating 26 of cathodic arc carbon, silicon carbide or boron carbide is instead accomplished by sputtering, with attention again being paid to process parameters in order to achieve the surface 53 characteristics desired.

We have determined that the roughness of the upper reaches of the surface 53 are of key importance for lapping purposes. In this regard, a preferable rough lapping surface is characterized by having peaks 54 (especially those terminating in the highest few percent of the surface 53) with radii of curvature less than one-half micron, while the vertical peak 54 to valley 55 height does not substantially exceed about 100 nanometers. Another topographic characterization of a preferred rough lapping surface 53 is that the peaks 54 that terminate in an upper five percent of the surface area differ in height by at least 5 nm, and preferably over 10 nm, within a 100 $\mu m^2$ overall surface area.

Figure 6:
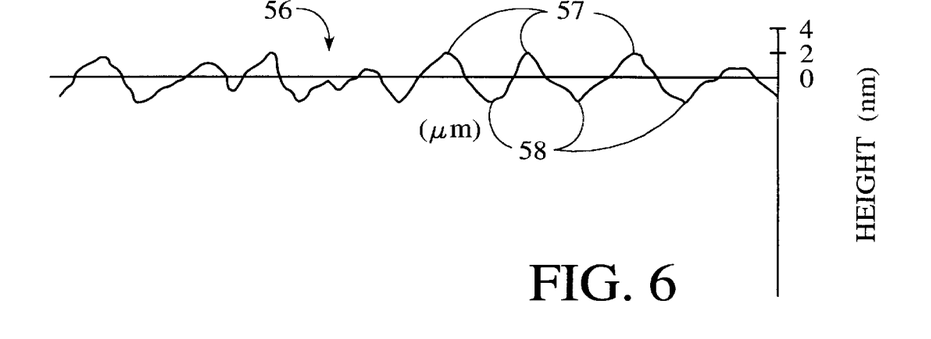
FIG. 6 is a plot of a surface topography of an interactive smooth lapping disk of the present invention.

A smoother, subsequent lapping disk surface 56 shown in FIG. 6 may be characterized by peaks 57 terminating in the highest few percent of the surface 56 that have radii of curvature generally between one-fifth and two microns, while the vertical peak 57 to valley 58 height, as before, does not exceed 100 nanometers. Alternatively, the peaks 54 of smooth lapping surface 56 that terminate in an upper one percent of the surface area differ in height by between 2 and 10 nanometers within a 100 $\mu m^2$ surface area.

Smooth lapping surface 56 is formed in a manner similar to that described above for rough lapping surface 53. It should be noted, however, that the substrate 24 is roughened a significantly lesser amount for a smooth surface 56 than for a rough surface 53, due to both a need for a smoother surface and a much thinner medium layer 23 and hard coating layer 26 which tend to mimic the texture of the substrate 24 more closely. In a preferred embodiment of a smooth lapping surface 56 to be employed for interactive lapping of magnetic transducers, a medium layer 23 and a hard coating layer 26 each may have a thickness of about 200 to 400 angstroms.

Figure 7:
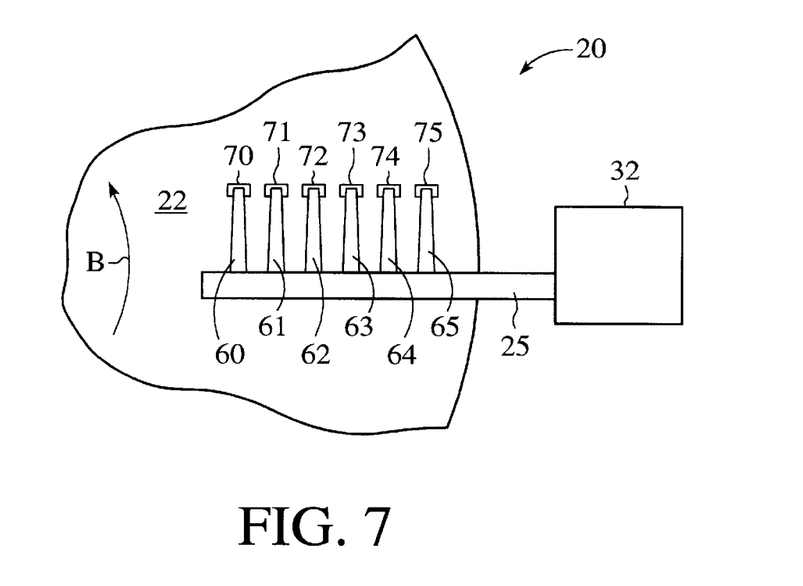
FIG. 7 is a fragmentary top view of a row of transducers being simultaneously lapped on an interactive lapping disk of FIG. 5 or FIG. 6 while individually controlled by a processor.

Referring now to FIG. 7, the support bar 25 holds a number of beams 60–65 and transducers 70–75 to lapping disk 20 for simultaneous lapping as the disk revolves in a direction indicated by arrow B. The transducers 70–75 are each independently connected to processor 32 so that the transducers 70–75 can be individually lifted from the lapping surface 22 as needed in response to signals received at processor 32 indicating that optimal lapping has occurred. In this manner, the prior art problem of row bar bowing is eliminated, as each of the transducers is individually controlled for optimal lapping, while numerous transducers can be lapped simultaneously, speeding manufacture.

Figure 8:
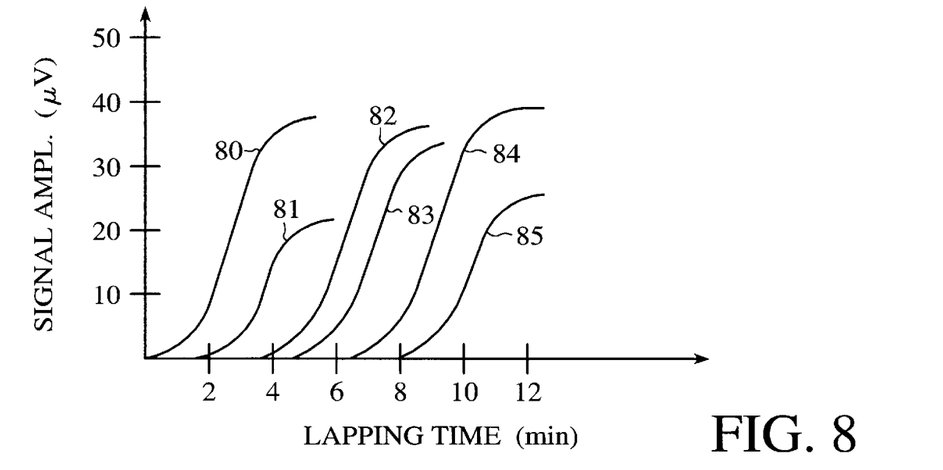
FIG. 8 is a superimposed plot of increasing amplitude electronic signals from the transducers of FIG. 7 received by the processor during lapping.

Plots of signals from transducers 70–75 are shown superimposed on a single graph in FIG. 8, to demonstrate the different times at which the signals from the various transducers 70–75 may increase in amplitude. Plot 80 represents a signal received from transducer 75, which ramps up in amplitude earlier than the other transducers and achieves a relatively high signal amplitude. Plot 81, corresponding to transducer 74, is the next signal to increase, but reaches a relatively low maximum value and may, for this reason, be discarded. Plots 82, 83 and 84 correspond to transducers 70, 71 and 72 respectively, which increase in amplitude later and reach a satisfactory value, while plot 85 corresponds to transducer 73, which is the last transducer to signal an increase in amplitude, and may result in transducer 73 being discarded due to the low value of amplitude achieved in plot 85. In practice, amplitude plots from a number of transducers may begin to increase simultaneously during lapping, while proceeding at different rates and reaching differing maximum amplitudes.

Figure 9:
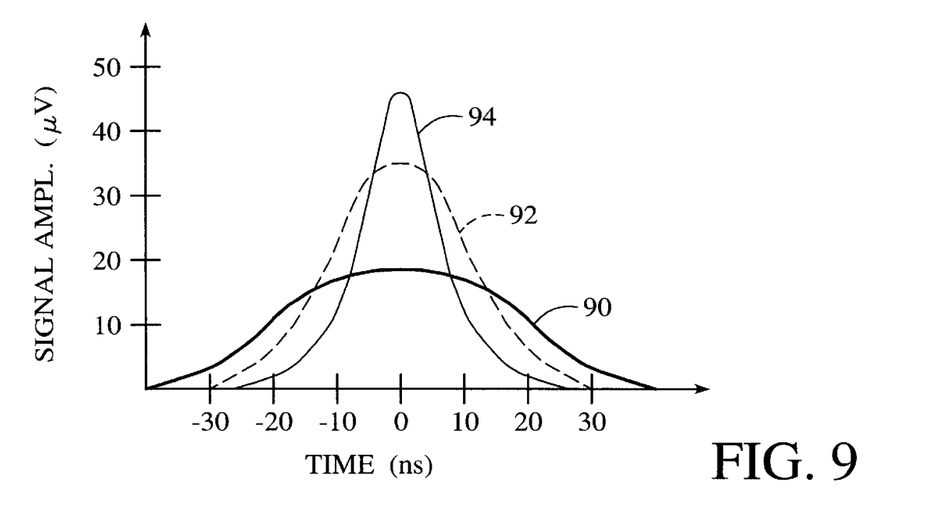
FIG. 9 is a plot of the shape of an isolated pulse signal from a transducer received by the processor during lapping.

FIG. 9 shows an alternative preferred method of monitoring transducer signals for determining optimal lapping amounts by looking to a shape of pulse waveforms transmitted to the processor 32 from an individual transducer 28 during lapping. In this system a signal is preferably written to the lapping disk 20 during lapping in order to optimize the pole tip for writing as well as reading, although the disk may instead be prewritten. For the situation in which the disk is prewritten, it is preferable to utilize the same spindle for writing as for reading. For the case in which the transducer 28 being lapped writes as well as reads signals during lapping, a series of isolated pulses are written by the transducer in a given disk track during one revolution of the disk, and during a subsequent revolution the transducer reads these isolated pulses. The resolution of the transducer 28 in both reading and writing is reflected by the shape of these isolated pulses, as narrower pulse widths correspond with higher resolution. Thus waveform 90, which can be seen to be relatively low and spread out in amplitude, may occur as lapping has proceeded sufficiently to allow a signal to be written and read by the transducer 28. As lapping continues the signal grows and narrows, as depicted in waveform 92, which is dashed in order to distinguish it from other superimposed curves. In waveform 94 the signal has become sharper still, reflecting a very high resolution, and has reached a shape where the transducer 28 will be lifted from the lapping disk. If transducer 28 is lapped too much, the amplitude of the pulse may continue to increase for a period of time, and then decrease as the shape of the pulse broadens, indicating reduced resolution. The appropriate time for termination of lapping can be indicated by the slowing and then cessation of the increase in signal sharpness, by a certain threshold PW50 or by a threshold narrowness in pulse time at half-maximum amplitude (e.g., 10 to 100 nanoseconds). Alternatively, performance tests generally employed in the recording industry, such as overwrite, bit-shift, 747 and others, may be employed during interactive lapping, and may be employed in concert.

FIG. 9 can also be used to illustrate another aspect of the current invention, as the waveforms 90, 92 and 94 can represent signals from different transducers, such as transducers 60, 61 and 62, respectively. In this situation, the waveforms 90, 92 and 94, if they represent the sharpest signals from transducers 60, 61 and 62, can be used to determine whether those transducers have acceptable resolution or are defective and should be discarded.

Since the resolution at which signals can be written and read is of a paramount importance in an information storage system, the above described method of determining when appropriate lapping has been achieved by monitoring pulse width resolution is ideally matched to the needs of many information storage systems. For example, the present invention may be directed to rigid disk storage systems, flexible disk storage systems, tape drive systems, card based media systems and essentially any other storage system that involves a transducer for reading and/or writing information with a relatively moving storage medium. Focusing on the context of a rigid disk magnetic drive system the present invention can be used for lapping sliders and/or heads for conventional flying heads, or for lapping heads for contact based communication between the transducer and the media.

Moreover, since virtually any transducer used for reading information can be thought of as a part of an information storage system, an information storage system is defined for the purpose of this invention to include all types of systems for communicating with a storage medium. For instance, an angular or linear motion detecting instrument may include a transducer for detecting relative positions, which can be seen to be a type of stored information. Similarly, an optical fiber can be used as an electro-optical transducer for obtaining information about the interior of a person's body, which can be seen to represent another form of communication with an information storage system. Sensors of magnetic, inductive, capacitative, electrically conductive, optical, radioactive, and other forms of information can be fabricated with the interactive system of the present invention.

Figure 10:
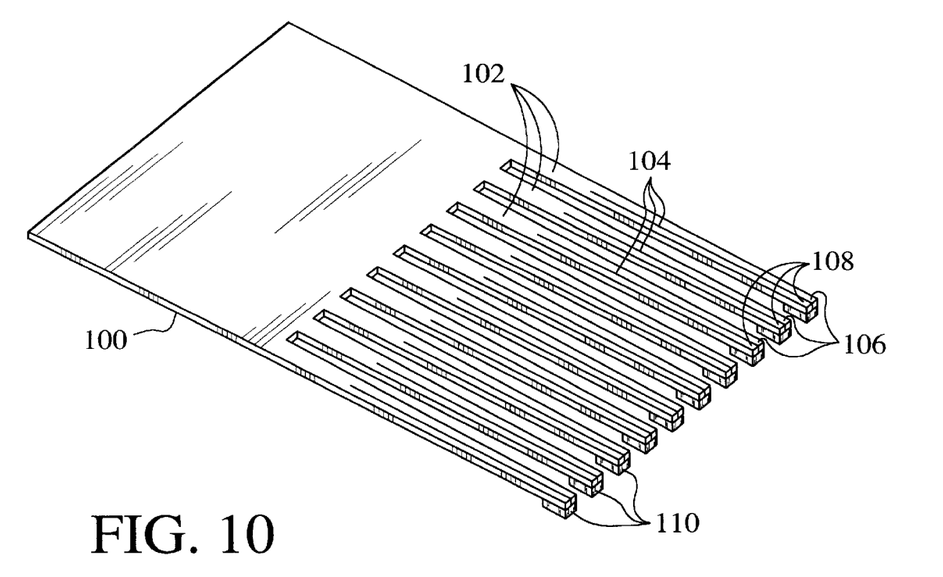
FIG. 10 is a perspective view of a row of transducers connected to flexible support beams for simultaneous interactive lapping.
Figure 11:
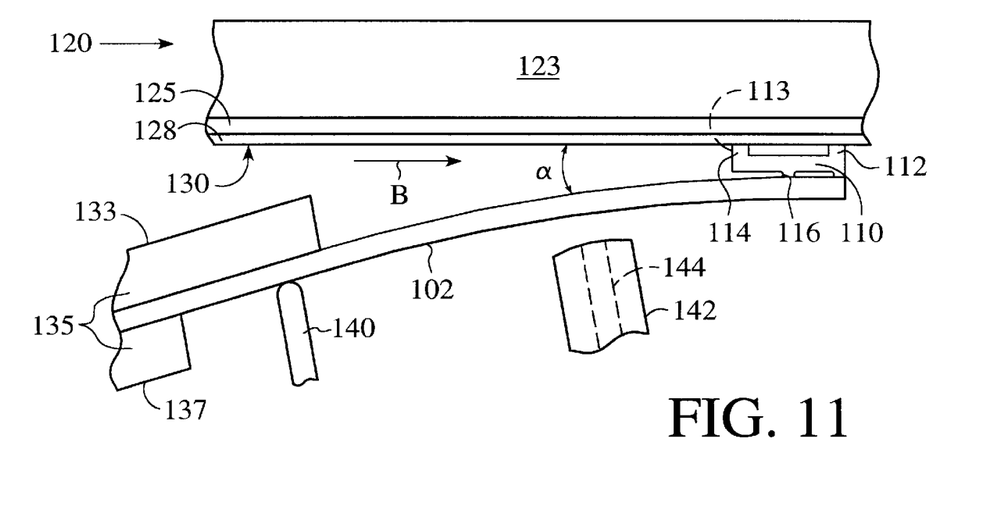
FIG. 11 is an expanded, cross-sectional, cut-away view of a system for holding and communicating with the transducers of FIG. 10 during lapping and for removing the transducers upon achieving individually optimized lapping.

FIGS. 10 and 11 show a means for monitoring and lifting transducers from a lapping plate on an individual basis. A strong, conductive plate 100 formed of stainless steel, beryllium copper, doped silicon or other materials has been micromachined or etched into a number of individual cantilevered beams 102, each of which has been dissected with a longitudinal cut 104, to form a pair of prongs 106 and 108. Conductively bonded to a bottom of the each of the beams 102 near a tip of the prongs 106 and 108 is a transducer 10 which has been formed to include magnetic reading and writing and mechanical elements as described in the aforementioned co-pending U.S. patent application Ser. No. 08/338,394, for TRANSDUCER/FLEXURE/CONDUCTOR STRUCTURE FOR ELECTROMAGNETIC READ/WRITE SYSTEM. Each of the transducers 110 includes a bottom surface having a pad 112 for contact with a rigid magnetic disk, not shown in this figure, the pad containing a pole for writing and reading to and from the magnetic disk.

FIG. 11 shows a portion of a lapping disk 120 including a substrate 123, a magnetic recording layer 125 adjoining the substrate 123 and a hard abrasive layer 128 disposed on the magnetic layer having a surface 130 for lapping or polishing a transducer 110. Only one transducer 110 and beam 102 are shown FIG. 11 for clarity, while one should note that sets of ten or more beams 102 and transducers 110, as shown in FIG. 10, are preferably lapped simultaneously. The transducer 110 of this embodiment has three triangularly spaced pads for contact with a disk 120, one of the non-polebearing pads (113) being hidden from view in this figure by another non-polebearing pad 114. A gimbal bump 116 allows the three pads 112–114 to be in simultaneous contact with the rigid magnetic recording disk despite small surface variations. The prongs 106 and 108 are connected to each transducer 110 to provide an electrical circuit for sending and receiving signals to and from the disk 120. The surface 130 is moving relative to a beam 102 attached to the transducer at a speed which may vary between 150 and 1500 inches per second in a direction indicated by arrow B, which is generally along a lengthwise direction of the beam 102. The beam 102 meets the disk 120 at an angle alpha relative to a plane of the surface 130 that may range between −3 and +3 degrees for lapping of a main contact area of the wear pad. As described in the above mentioned pending U.S. patent application Ser. No. 08/338,394, other gimbal and beam structures may be advantageously employed, but is not shown here for brevity.

An upper plate 133 of a clamp 135 that holds the beam 102 extends further along the beam 102 than a lower plate 137 of that clamp so that a communication pin 140 can press against a conductive lead of the beam 102 for transmitting signals between the transducer 110 and a processor, not shown in this figure. Although only one pin 140 is shown in FIG. 8, a second pin is also employed for communication with each of the prongs 104 and 106 of the beams 102 shown in FIG. 10, so that each transducer 110 has a pair of leads for independent communication with a processor regarding appropriate lapping time and test characteristics. A removal block 142 has an air duct 144 which is connected to a vacuum source, not shown, with a solenoid valve that is controlled by the transducer to be opened when the transducer receives a signal that lapping should be terminated. When the valve is opened the differential air pressure caused by communication between the vacuum source and the air duct 144 causes beam 102 to be pulled to the block 142 and transducer 110 to be removed from the lapping process. The block 142 has a different air duct for each beam 102 so that the various transducers 110 can be removed on an individual basis according to their individual optimal lapping needs.

Figure 12:
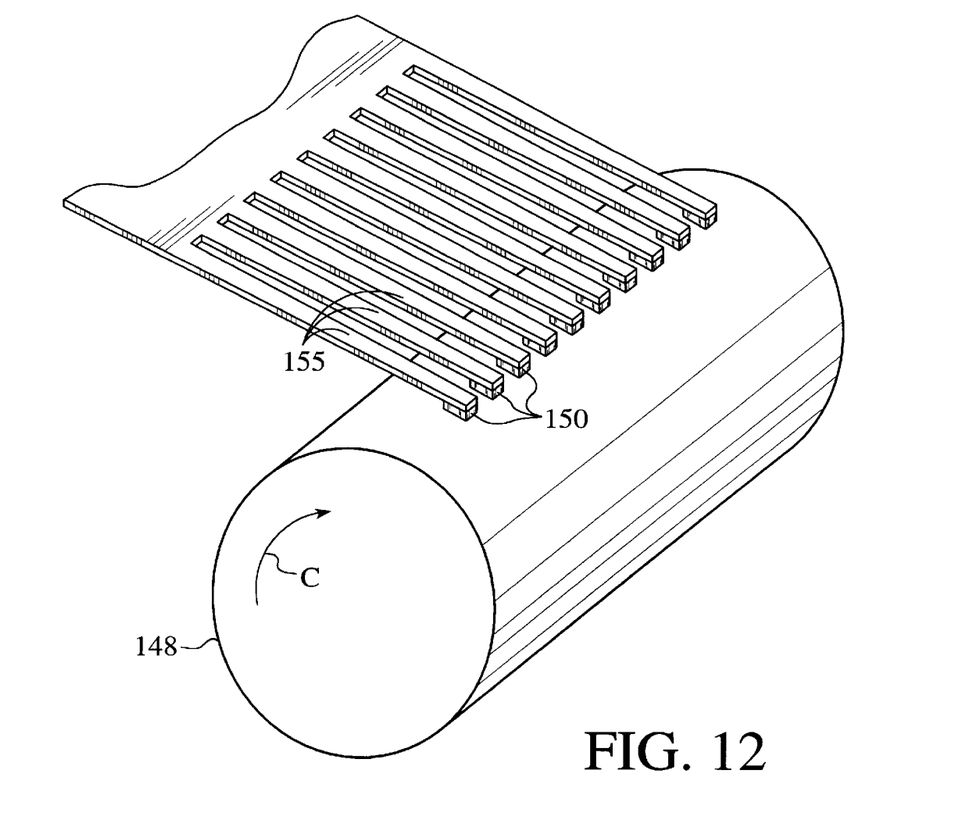
FIG. 12 is a fragmentary perspective plan view of an interactive lapping drum employed for lapping a row of single pad transducers.
Figure 13:
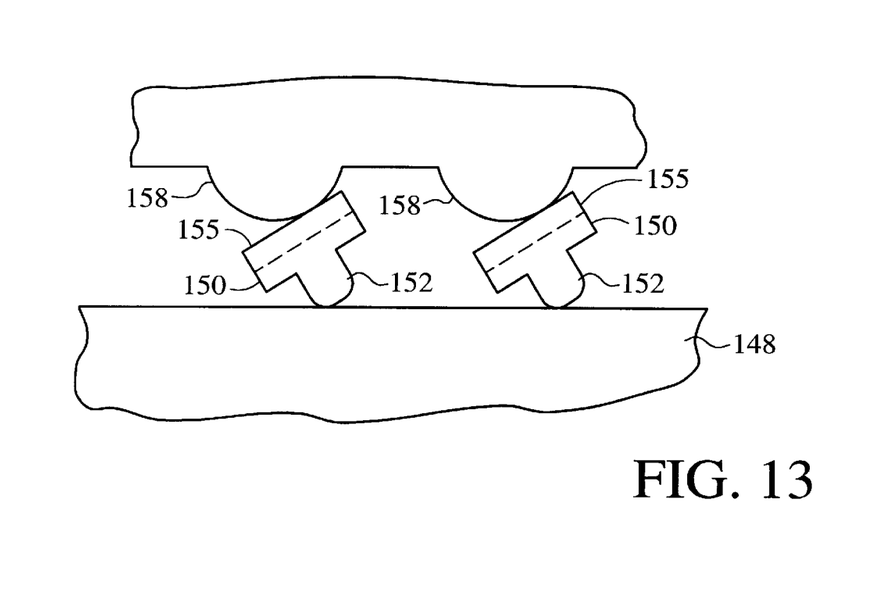
FIG. 13 is a fragmentary cross-sectional view of a pair of transducers and pads of FIG. 12 being tilted during lapping for rounding of the pads.

Referring now to FIGS. 12 and 13, a lapping drum 148 may be employed in machining transducers 150 having single contact pad 152 containing a magnetic pole structure, not shown in this figure. The drum 148 offers a uniform lapping speed to each of the transducers 150 or other items being lapped in a row, and rotates in this example in a direction of arrow C. Transducers 150 are disposed at ends of flexible beams 155, and can be rounded at the tip of the pads 152 by tilting the beams 155 and by moving the beams forward and backward relative to the drum 148 so that different parts of the pads are tangent to the drum 148 during lapping. This is important for a single pad contact magnetic read-write head in order to ensure close proximity between the pole disposed within the head and the medium even in situations in which the pad contacts the surface of the recording disk at an angle to normal. Rounding of front and back facets of the single pad 152 can also be accomplished by varying the angle at which a plane containing the beams 155 addresses the lapping drum 148, a technique similarly applicable to lapping with a disk.

Also applicable to a lapping disk environment is the rounding of side facets of the pads 152 by tilting a series of transducers 150 each having a single pad 152, which can be achieved by holding each beam 155 with a clamp that can rotate somewhat about the long axis of the beam, not shown. Note that only one side of the clamp needs to rotate if the other side has a semicylindrical surface 158, and that the elements of each clamp that rotate may be each pivotally attached to a bar in a series, not shown. Another advantage of the faceting or rounding of pads 150 as discussed above is not only the elimination of pole tip recession in transducer formation but the converse creation of pole tip protrusion.

Figure 14:
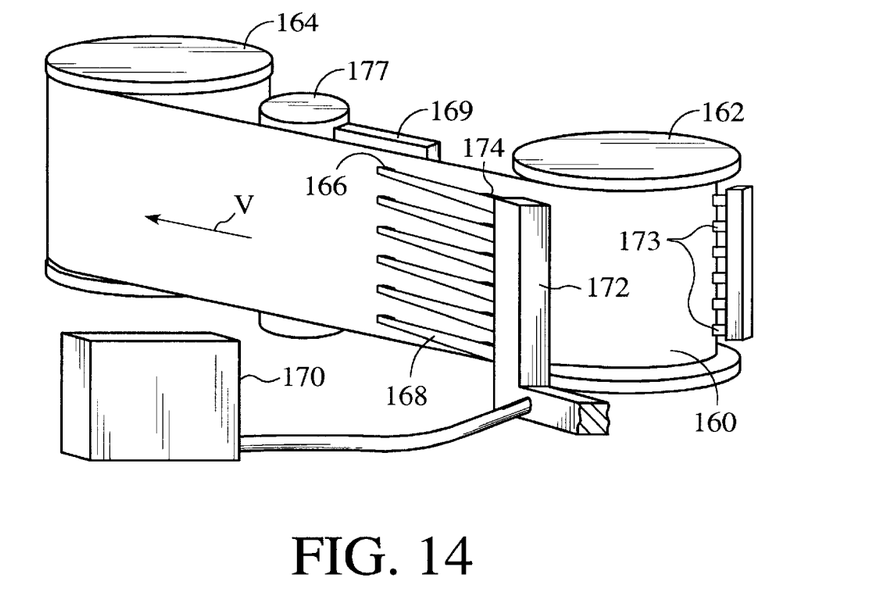
FIG. 14 is a simplified plan view of an interactive lapping tape system of the present invention.

Instead of interactively lapping transducers with a rigid body such as a disk or drum as described in previous embodiments, it may be advantageous to employ a flexible lapping medium such as a tape 160, as shown in a simplified view in FIG. 14. In this embodiment, the abrasive magnetic storage tape 160 is wound from a first reel 162 to a second reel 164 in a direction shown by arrow V, while a row of transducers 166, each held by a beam 168, are pressed against the tape. An adjustable platen 169 disposed on an opposite side of the tape from the transducers 166 provides backing for lapping. The tape 160 and transducers 166 may be designed for longitudinal or perpendicular communication with the tape, that is, storage of magnetic information in domains having remnant magnetization oriented generally parallel or perpendicular to the plane of the tape. The transducers 166 are each connected with a processor 170 via a bar 172, the processor individually monitoring communication between each transducer 166 and the tape 160 in order to individually control lapping of each transducer 166. A row of recording heads 173 may be positioned along the tape upstream of the transducers 166 in order to write data tracks to the tape 160 for communication with the transducers. A positioning element 174 is attached to each beam 168 and the bar 172 and electronically connected to the processor 170 for removal of the transducers 166, individually or as a group, upon actuation by the processor, as determined by signals received at the processor from the tape via the transducers.

Employment of an interactive lapping tape rather than a disk or drum offers a number of potential advantages, not the least of which is that the tape may be cost effective, so that it can easily be replaced when worn out. In addition, due to the flexibility of the tape 160, it tends to conform somewhat to the item being lapped, which is desirable for rounding edges of that item in particular for a final stage of lapping in order to counteract pole tip recession. For instance, a transducer having a single wear pad with an embedded magnetic pole for contact communication with a medium may be rounded in this manner to avoid separation of the pole from the medium during tilting of the transducer. Alternatively, flying heads for which edge blending or rounding is desired may be advantageously finished with such a tape 160. Furthermore, transducer heads designed for end user employment in tape drives may benefit from such interactive tape lapping, as such heads often are rounded.

Another potential advantage of an interactive, tape based lapping system may be the ability to closely control the pressure of lapping, for example by employing a capstan 177 that provides an adjustable backing to the tape 160, in concert with or in the absence of platen 169. Alternatively, variable air pressure may be used to adjust the pressure felt by the transducers 166 during lapping. The tension provided to the tape 160 provides a means for controlling both the pressure on the transducers 166 and the degree of conformance of the tape to the transducers, thereby controlling the amount that transducer edges are rounded. In this regard it should be noted that rounding of corners may occur differentially for corners that are oriented along the direction of tape motion as compared with corners oriented essentially perpendicular to the direction of tape, due to differing tension of the tape in those different directions.

Although a reel-to-reel lapping system is depicted in FIG. 14, in many cases a continuous or endless loop interactive lapping tape may be advantageously employed. It should be noted that a tape lapping body, like a drum lapping body, has the advantage of uniform lapping speed for a number of items being lapped. One should also note that oscillating or vibrating lapping motion is possible with any of the lapping bodies described so far (disk, tape and drum), rather than the unidirectional motion previously described, and such alternative motions may also be utilized with other lapping bodies, such as a card, plank, plate or irregularly shaped body.

Figure 15:
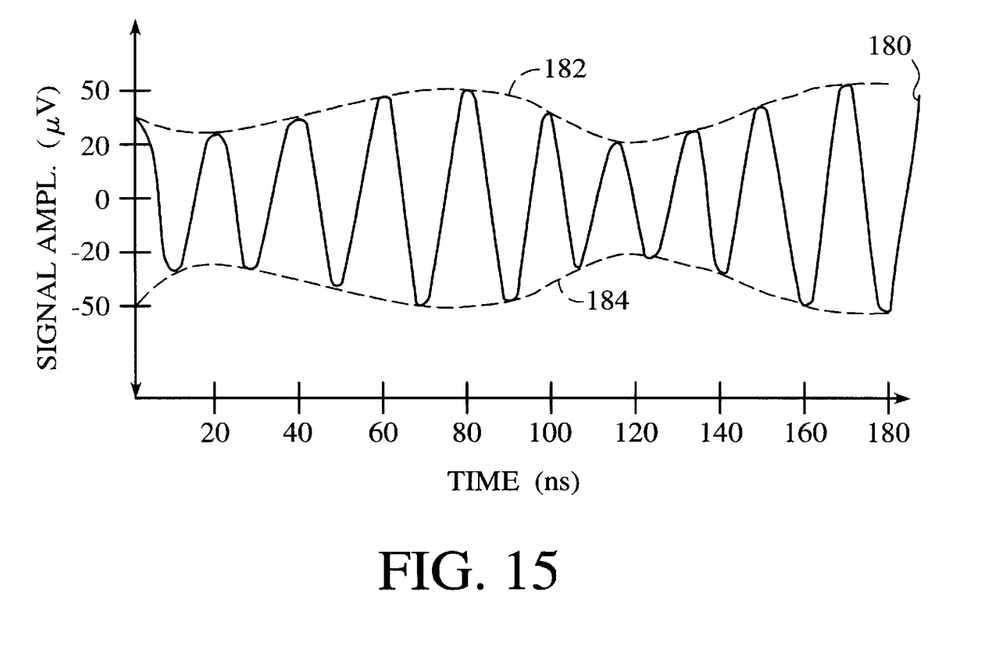
FIG. 15 is a plot of a signal from a transducer being analyzed for performance characteristics and displaying an amplitude modulation indicating that the transducer is defective.

FIG. 15 illustrates another aspect of the present invention—the ability to test transducers for electrical, magnetic, mechanical, dynamic, optical or other performance characteristics of a transducer at the time of lapping, again offering a substantial savings in time and equipment while potentially improving performance. Sinusoidally varying curve 180 is a plot of the signal received by a transducer during lapping with a body having an alternating signal written to a medium of that body, as can be the situation, for example, with magnetic data storage. The curve 180 has a signal amplitude modulation represented by dashed lines 182 and 184, which form an envelope for the curve 180. This amplitude modulation may be caused by vibration of the transducer being tested, or electronic or magnetic problems of the transducer, for instance. Note that the particular signal amplitudes and times shown in FIG. 15 are merely representative of a specific transducer with specific performance traits, and that such amplitudes and times may vary greatly depending upon the transducer. Alternatively, lines 182 and 184 may represent aerodynamic characteristics of a flying head slider that has been lapped and is pitching or rolling during flight. For the testing of a flying head and slider, the transducer is first lapped by an appropriate amount by employing the interactive technique taught above, after which the slider may be tested for aerodynamic characteristics by increasing the rotational speed of the disk and/or reducing the load applied to the transducer that holds it to the disk during lapping. Should the signal received from the transducer appear as displayed in curves 182 and 184, which can be detected with filtering or amplitude demodulation, for example, an unstable transducer head or slider structure is indicated, which would potentially result in a crash of the transducer and disk that would destroy the drive system.

For situations in which a second lapping or test disk is employed that is smoother than the first and essentially free of lapping debris, testing of various characteristics of the transducer or transducers can be advantageously accomplished. This second lapping disk may be useful, for example, for the situation in which the transducer is designed for contact based communication with a disk, tape, drum or other media, since the roughness of the first lapping disk may make testing of performance characteristics of the transducer with the rough disk difficult. Alternatively, for the case of a flying head, testing performed at a separate disk may allow for more realistic testing of critical dynamic performance characteristics that occur during takeoff and landing of the head. Note also that the performance testing and grading may be accomplished in serial or parallel tests on multiple transducers with a single lapping or testing apparatus, in order to simultaneously optimize multiple performance parameters.

We claim:

1. A motor-driven device comprising:
    a transducer held by a positioning arm, and
    a body with an abrasive surface for machining said transducer and removing excess material therefrom, said body having a communicative portion for transmitting an electromagnetic signal via said surface to said transducer for controlling said machining.

2. The device of claim 1, wherein said surface is generally flat.

3. The device of claim 1, wherein said body is a disk.

4. The device of claim 1, wherein said communicative portion is magnetic.

5. The device of claim 1, and further comprising a motor connected to said body and effecting motion relative to said transducer, whereby said transducer is lapped with said surface.

6. The device of claim 1, wherein said surface is super-hard.

7. The device of claim 1, and further comprising a mechanism for holding said transducer against said surface during said removing and away from said surface in response to detection of said signal by said transducer.

8. A device for fabricating an element of an information storage system comprising:
    a transducer,
    an abrader defining a work zone for the selected removal of material from said transducer positioned within said zone, and
    a communication structure associated with said abrader within said zone, said communication structure capable of sending an electromagnetic signal to said transducer, such that communication between said structure and said transducer is indicative of a performance characteristic of the transducer.

9. The device of claim 8, wherein said communication structure includes a magnetic medium layer.

10. The device of claim 8, wherein said transducer is connected to a processor for analyzing performance characteristics of said transducer.

11. The device of claim 8, further comprising a mechanism holding said transducer against said surface during said removing, and holding said transducer away from said body upon detection of said signal.

12. A device for fabricating a transducer for an information storage system comprising:
    a moveable body having an abrasive work surface,
    an implement holding a workpiece adjacent to said surface,
    a mechanism adapted for moving said surface relative to said workpiece for shaping said workpiece, and
    an electromagnetic signal transmitted from said body to said workpiece for controlling lapping of said workpiece, whereby said workpiece is formed into the transducer.

13. The device of claim 12, wherein said signal is produced by a magnetic pattern of said body.

14. The device of claim 12, wherein said signal is produced by an electrical pattern of said body.

15. The device of claim 12, and further comprising a processor connected to said workpiece for determining characteristics of said workpiece in response to said signal.

16. The device of claim 12, and further comprising a processor connected to said implement for positioning said workpiece relative to said surface in response to said signal.

17. A production device comprising:

a body having an abrasive surface and transmitting an electromagnetic signal via said surface, a transducer capable of receiving and transducing said signal, positioning means for holding said transducer relative to said surface, motor means for moving the transducer relative to said surface, and processing means, connected to the transducer and to said positioning means, for analyzing information from the transducer regarding said signal and for controlling said positioning means.

18. The device of claim 17, wherein said system has means for simultaneously lapping a plurality of transducers while individually determining an optimal lapping of each of said transducers and thereupon individually terminating said lapping.

* * * * *